(12) United States Patent
Liu

(10) Patent No.: US 7,555,306 B2
(45) Date of Patent: Jun. 30, 2009

(54) METHOD AND SYSTEM FOR MOBILE DEVICE PERFORMANCE MONITORING

(75) Inventor: Lei Liu, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 589 days.

(21) Appl. No.: 11/445,407

(22) Filed: Jun. 1, 2006

(65) Prior Publication Data

US 2007/0281623 A1 Dec. 6, 2007

(51) Int. Cl.
*H04Q 7/20* (2006.01)
(52) U.S. Cl. ........................ 455/522; 455/423; 455/424; 455/425; 455/67.11; 455/500; 370/270; 370/242; 370/343; 379/1.01; 379/26.02; 379/27.03
(58) Field of Classification Search .................. 455/522, 455/501, 517, 500, 423–425, 422.1, 418–420, 455/67.11, 9, 11.1, 67.12–67.16, 403, 550.1; 370/242, 270, 343, 310, 312; 379/1.01, 21, 379/26.02, 27.03
See application file for complete search history.

(56) References Cited

U.S. PATENT DOCUMENTS

| | | | |
|---|---|---|---|
| 2005/0027466 A1* | 2/2005 | Steinmetz et al. | 702/63 |
| 2005/0130675 A1* | 6/2005 | Burch et al. | 455/456.5 |
| 2005/0163047 A1* | 7/2005 | McGregor et al. | 370/229 |
| 2007/0254644 A1* | 11/2007 | Dobson et al. | 455/423 |

* cited by examiner

*Primary Examiner*—Keith T Ferguson
(74) *Attorney, Agent, or Firm*—Osha • Liang LLP

(57) ABSTRACT

A method for monitoring performance of a mobile device involves intercepting a first monitoring request from a monitoring management host, where the first monitoring request is associated with the mobile device, enabling a monitoring agent associated with the mobile device, establishing a thin listener associated with the monitoring agent, transmitting a second monitoring request, in response to the first monitoring request, to the mobile device, receiving, by the thin listener, data from the mobile device in response to the second monitoring request, analyzing the data received in response to the second monitoring request to obtain an analysis report, and transmitting the analysis report to the monitoring management host, in response to the first monitoring request.

20 Claims, 7 Drawing Sheets

METHOD AND SYSTEM FOR MOBILE DEVICE PERFORMANCE MONITORING

BACKGROUND

As mobile devices become increasingly prevalent, users' reliance on mobile devices for various tasks increases accordingly. For example, mobile devices are frequently relied upon for telephony, electronic messaging, etc. Because of this reliance on mobile devices, mobile service providers have an interest in providing high quality of service (hereinafter "QoS"), and timely resolution of any QoS-related incidents. For example, a cellular service provider may have an interest in maintaining a minimum uptime percentage, a minimum coverage area, or any other cellular QoS-related metric. Those skilled in the art will appreciate that many different types of mobile service providers exist (e.g., telephony, electronic messaging, multimedia messaging, etc.), and many different types of QoS-related concerns (e.g., storage space, bandwidth utilization, computational overhead, disconnections, network traversal flow, packet loss, location tracking, call blocking, handoff blocking, etc.) exist.

To quickly determine when QoS-related issues arise, mobile service providers may monitor individual devices being serviced. For example, an Internet-connected personal digital assistant (PDA) may be monitored for latency, bandwidth usage, uptime, or any other aspect of the PDA. Those skilled in the art will appreciate that many different types of mobile devices exist, and many different aspects of a mobile device may be monitored.

When monitoring a mobile device, data retrieved from the mobile device may be analyzed, to identify information that may indicate a QoS-related issue. For example, a sharp increase in downtime may indicate a network failure, or a sharp decrease in response time may indicate network congestion. Those skilled in the art will appreciate that many different types of analysis may be performed.

Typically, to monitor mobile devices on a network, a global monitoring host is communicatively coupled with the mobile devices. The global monitoring host issues monitoring requests directly to the mobile devices. In response to the monitoring requests, the mobile devices transmit monitoring-related data directly to the global monitoring host. The global monitoring host then analyzes the transmitted data to identify any potential QoS-related issues. If a potential issue is identified, the global monitoring host may take an appropriate action, e.g., initiate a helpdesk ticket, modify a QoS-related system setting, etc. Those skilled in the art will appreciate that many different responses to a possible QoS-related issue exist.

Those skilled in the art will appreciate that in the system described above, the global monitoring host is a central point of failure. Specifically, if the global monitoring host fails, then no monitoring of the mobile devices is possible. Further, those skilled in the art will appreciate that as the number of mobile devices being monitored increases, so does the amount of network traffic around the global monitoring host, which may result in network congestion. Thus, network bandwidth constraints may limit the number of mobile devices that the global monitoring host can monitor. Additionally, those skilled in the art will appreciate that as the number of mobile devices being monitored increases, so does the processing power required of the global monitoring host. Thus, processing constraints may limit the number of mobile devices that the global monitoring host can monitor.

SUMMARY

In general, in one aspect, the invention relates to a method for monitoring performance of a mobile device, comprising intercepting a first monitoring request from a monitoring management host, wherein the first monitoring request is associated with the mobile device, enabling a first monitoring agent associated with the mobile device, establishing a first thin listener associated with the first monitoring agent, transmitting a second monitoring request, in response to the first monitoring request, to the mobile device, receiving, by the first thin listener, data from the mobile device in response to the second monitoring request, analyzing the data received in response to the second monitoring request to obtain an analysis report, and transmitting the analysis report to the monitoring management host, in response to the first monitoring request.

In general, in one aspect, the invention relates to a system comprising a monitoring agent dispatcher configured to intercept a first monitoring request from a monitoring management host, wherein the first monitoring request is associated with a mobile device, and enable a first monitoring agent associated with the mobile device, a first thin listener configured to transmit a second monitoring request to the mobile device, in response to the first monitoring request, receive data from the mobile device, in response to the second monitoring request, and transfer the data to the first monitoring agent, and the first monitoring agent, configured to analyze the data to obtain an analysis report, and transmit the analysis report to the monitoring management host, in response to the first monitoring request.

In general, in one aspect, the invention relates to a computer readable medium comprising executable instructions for monitoring performance of a mobile device by intercepting a first monitoring request from a monitoring management host, wherein the first monitoring request is associated with the mobile device, enabling a first monitoring agent associated with the mobile device, establishing a first thin listener associated with the first monitoring agent, transmitting a second monitoring request, in response to the first monitoring request, to the mobile device, receiving, by the first thin listener, data from the mobile device in response to the second monitoring request, analyzing the data received in response to the second monitoring request to obtain an analysis report, and transmitting the analysis report to the monitoring management host, in response to the first monitoring request.

Other aspects of the invention will be apparent from the following description and the appended claims.

DETAILED DESCRIPTION

Figure 1:
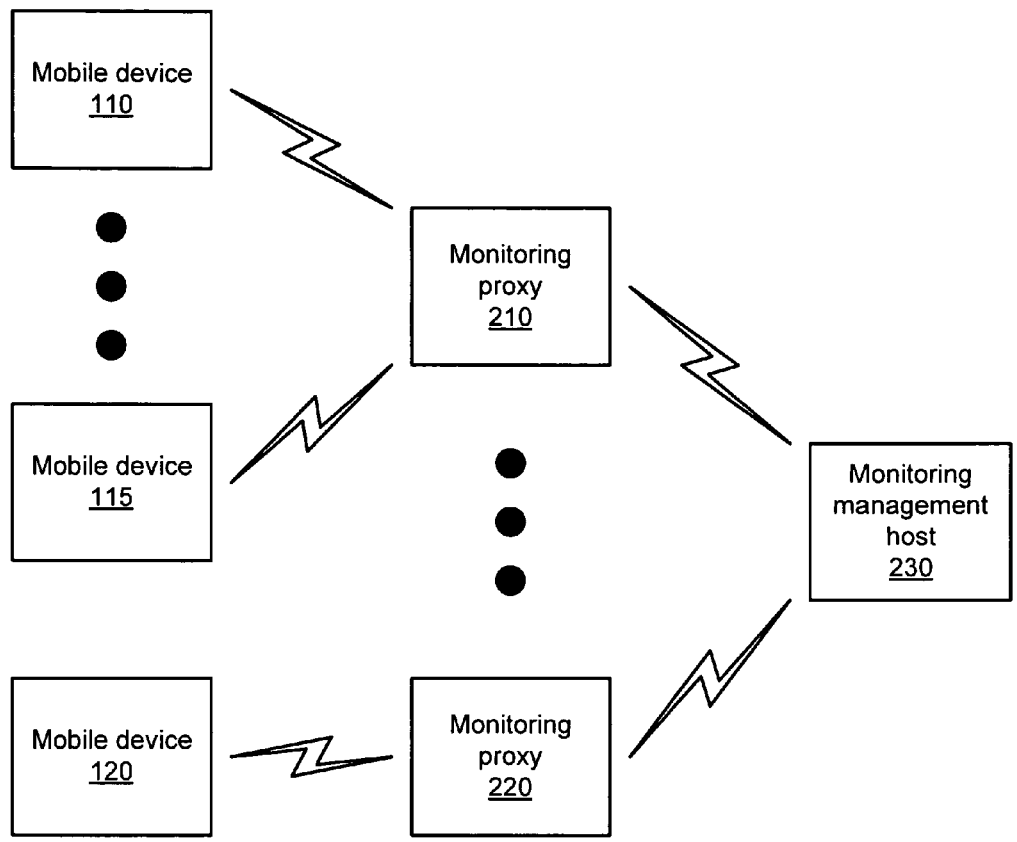
FIG. 1 shows a diagram of a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to monitor performance of a mobile device. Specifically, a monitoring proxy operates between a monitoring management host and the mobile device. The monitoring proxy is configured to analyze performance-related data from the mobile device. In one or more embodiments of the invention, the monitoring proxy is also configured to simulate the mobile device, in the event that the mobile device is not available. Further, in one or more embodiments of the invention, the monitoring proxy is configured to initiate a performance-related adjustment, based on the analysis.

FIG. 1 shows a diagram of a system in accordance with one embodiment of the invention. Specifically, FIG. 1 shows a diagram of a network including one or more mobile devices (110, 115, 120), one or more monitoring proxies (210, 220), and a monitoring management host (230). In one or more embodiments of the invention, the network may be a wireless network, a wired network, a cable television network, a cellular network, or any other similar type of network. Further, in one or more embodiments of the invention, the network may be a combination of different types of networks.

In one or more embodiments of the invention, the monitoring management host (230) is configured to issue a monitoring request associated with one or more mobile devices (e.g., 110, 115, 120). In one or more embodiments of the invention, the monitoring request may be a request for latency information, bandwidth usage information, downtime information, or any other similar type of request.

In one or more embodiments of the invention, monitoring proxies (e.g., 210, 220) are configured to intercept monitoring requests. In one or more embodiments of the invention, a monitoring request is intercepted transparent to the monitoring management host (230). In other words, the monitoring management host (230) assumes that the monitoring request is transmitted directly to the mobile device (e.g., 110, 115, 120). Alternatively, in one or more embodiments of the invention, the monitoring management host (230) is configured to transmit the monitoring request directly to a monitoring proxy (e.g., 210, 220). In other words, the monitoring management host (230) is specifically configured to use a monitoring proxy (e.g., 210, 220) as an intermediary. Thus, the monitoring request may be intercepted explicitly by the monitoring proxy (e.g., 210, 220). Those skilled in the art will appreciate that any combination of explicit and transparent interception may be used. Further, in one or more embodiments of the invention, intercepting the monitoring request may be based on a proximity of a monitoring proxy (e.g., 210, 220) to a mobile device (e.g., 110, 115, 120) on the network (e.g., a monitoring proxy having the fewest number of network hops and/or lowest latency to the mobile device), a predetermined association between a particular monitoring proxy (e.g., 210, 220) and a mobile device (e.g., 110, 115, 120), or any other factor.

In one or more embodiments of the invention, a monitoring proxy (e.g., 210, 220) may be associated with multiple mobile devices (e.g., 110, 115, 120). For example, as shown in FIG. 1, monitoring proxy (210) is associated with mobile device (110) and mobile device (115). Further, in one or more embodiments of the invention, a monitoring proxy (e.g., 210, 220) may be configured in one-to-one correspondence with a mobile device (e.g., 110, 115, 120). For example, as shown in FIG. 1, monitoring proxy (220) is configured to correspond only with mobile device (120). Those skilled in the art will appreciate that many different arrangements of one-to-many correspondences, one-to-one correspondences, or combinations thereof may be used, and that one-to-many and one-to-one correspondences may be determined dynamically, predetermined, or any combination thereof.

Those skilled in the art will appreciate that the use of monitoring proxies provides for risk distribution. Specifically, if a monitoring proxy fails, other monitoring proxies may continue to function. Further, in one or more embodiments of the invention, if a monitoring proxy fails, then another monitoring proxy may assume the monitoring tasks associated with the failed monitoring proxy. Those skilled in the art will appreciate that, in one or more embodiments of the invention, a mobile device associated with the failed monitoring proxy may store QoS-related data in a data cache, to be sent to the new monitoring agent when it becomes available to the mobile device. In this manner, the amount of QoS-related data lost due to the monitoring proxy failure may be minimized or eliminated.

Moreover, the use of monitoring proxies may allow monitoring to continue even if a monitoring management host fails (e.g., by caching monitoring data in the monitoring proxies, to be sent to the monitoring management host when it becomes available again). Further, those skilled in the art will appreciate that the use of monitoring proxies may reduce the amount of network traffic around the monitoring management host, thereby increasing the number of mobile devices that can be monitored simultaneously without causing network congestion.

Figure 2:
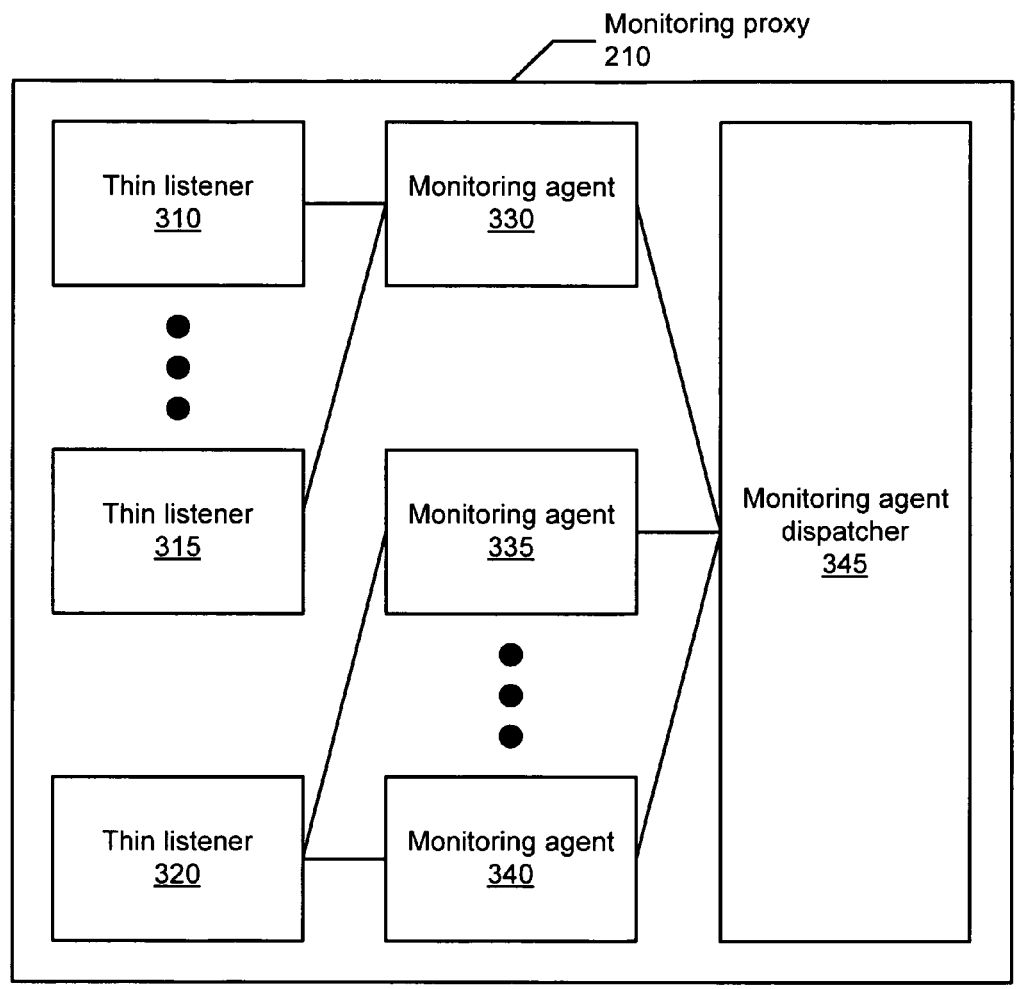
FIG. 2 shows a diagram of a monitoring proxy in accordance with one embodiment of the invention.

FIG. 2 shows a diagram of a monitoring proxy (210) in accordance with one embodiment of the invention. Specifically, FIG. 2 shows components of the monitoring proxy (210), including one or more thin listeners (310, 315, 320), one or more monitoring agents (330, 335, 340), and a monitoring agent dispatcher (345). In general, embodiments of the invention discussed herein involve thin listeners (e.g., 310, 315, 320) co-located with monitoring agents (e.g., 330, 335, 340) at a monitoring proxy (e.g., 210). However, those skilled in the art will appreciate that one or more thin listeners (e.g., 310, 315, 320) may alternatively be located directly on a mobile device. Those skilled in the art will appreciate that in such cases, one or more aspects of embodiments of the invention discussed herein may differ accordingly. Exemplary differences are discussed in detail below.

In one or more embodiments of the invention, the monitoring agent dispatcher (345) is configured to intercept a monitoring request from a monitoring management host. As described above, the intercepting may be explicit or transparent. In one or more embodiments of the invention, the monitoring management host (345) is configured to enable one or more monitoring agents (e.g., 330, 335, 340) based on a characteristic of the monitoring request. For example, the specific monitoring agents (e.g., 330, 335, 340) enabled may be based on the type of the monitoring request (e.g., latency, bandwidth, downtime, etc.), the number of mobile devices with which the monitoring request is associated, or any other factor. Alternatively, in one or more embodiments of the invention, the same number of monitoring agents (e.g., 330, 335, 340) may be enabled for every monitoring request.

More specifically, in one or more embodiments of the invention, for one type of request, only a single monitoring agent (e.g., 330, 335, or 340) may be enabled, while for another type of request, multiple monitoring agents (e.g., 330, 335, 340) may be enabled. For example, a monitoring request may cause multiple monitoring agents (e.g., 330, 335, 340) to be enabled, each performing a different monitoring function and/or monitoring different mobile devices. Those skilled in the art will appreciate that multiple monitoring agents (e.g., 330, 335, 340) may be configured to communicate with each other, to jointly service the monitoring request.

In one or more embodiments of the invention, enabling a monitoring agent (e.g., 330, 335, 340) may involve activating a hardware device, instantiating a software object, activating a memory-resident service, or any other similar type of enablement action. Thus, in one or more embodiments of the invention, a monitoring agent (e.g., 330, 335, 340) may already exist prior to being enabled, or may require instantiation prior to being enabled.

In one or more embodiments of the invention, when enabled, a monitoring agent (e.g., 330, 335, 340) is configured to establish one or more thin listeners (e.g., 310, 315, 320). Alternatively, in one or more embodiments of the invention, one or more thin listeners (e.g., 310, 315, 320) may be established by the monitoring agent dispatcher (345) or any other component of the monitoring proxy (210). Those skilled in the art will appreciate that if a thin listener (e.g., 310, 315, 320) is located directly on a mobile device, then establishing the thin listener (e.g., 310, 315, 320) may not be required. Further, in one or more such cases, authorization by the thin listener (e.g., 310, 315, 320) may be required to enable a monitoring agent (e.g., 330, 335, 340) to perform monitoring functions associated with the mobile device.

In one or more embodiments of the invention, only a single thin listener (e.g., 310, 315, or 320) is established for a given monitoring agent (e.g., 330, 335, or 340). For example, as shown in FIG. 2, monitoring agent (335) is associated with a single thin listener (320). Further, if more than one monitoring agent (e.g., 330, 335, 340) is enabled, as described above, then more than one monitoring agent (e.g., 330, 335, 340) may be configured to use a single thin listener (e.g., 310, 315, or 320). For example, as shown in FIG. 2, monitoring agent (335) and monitoring agent (340) are both associated with the same thin listener (320). Those skilled in the art will appreciate that in such cases, a thin listener (e.g., 310, 315, 320) may only require being established once.

Further, in one or more embodiments of the invention, multiple thin listeners (e.g., 310, 315, 320) may be established for a single monitoring agent (e.g., 330, 335, or 340). For example, as shown in FIG. 2, monitoring agent (330) is associated with thin listener (310) and thin listener (315). Those skilled in the art will appreciate that multiple thin listeners (e.g., 310, 315, 320) may be used, for example, if a monitoring request is directed to more than one mobile device.

In one or more embodiments of the invention, establishing a thin listener (e.g., 310, 315, 320) may involve activating a hardware device, instantiating a software object, activating a memory-resident service, or any other similar type of enablement action. Thus, in one or more embodiments of the invention, a thin listener (e.g., 310, 315, 320) may already exist prior to being established, or may require instantiation prior to being enabled.

In one or more embodiments of the invention, a thin listener (e.g., 310, 315, 320) is configured to communicate with a mobile device. Specifically, the thin listener (e.g., 310, 315, 320) is configured to communicate the monitoring request to the mobile device. In one or more embodiments of the invention, the thin listener (e.g., 310, 315, 320) is configured to simply forward the monitoring request received from the monitoring management host to the mobile device. Alternatively, the monitoring request may be translated to another format, used to construct a new monitoring request, or modified in any other way, prior to being forwarded to the mobile device. Further, in one or more embodiments of the invention, a monitoring agent (e.g., 330, 335, 340) may forward the monitoring request to the mobile device. Those skilled in the art will appreciate that many different ways to forward a monitoring request exist.

Further, in one or more embodiments of the invention, the thin listener (e.g., 310, 315, 320) is configured to receive data from the mobile device in response to the monitoring request. For example, the thin listener (e.g., 310, 315, 320) may receive latency data, bandwidth data, downtime data, or any other similar type of data. Further, in one or more embodiments of the invention, once a thin listener (e.g., 310, 315, 320) is established, the thin listener (e.g., 310, 315, 320) may intercept any future monitoring requests directed to the mobile device with which it is configured to communicate. Alternatively, the monitoring agent dispatcher (345) may continue to intercept monitoring requests and then forward them to the appropriate thin listener (e.g., 310, 315, 320).

Those skilled in the art will appreciate that the use of thin listeners may provide for support of multiple mobile device types, e.g., by providing a different type of thin listener for each type of mobile device. Further, if the thin listeners, monitoring agents, monitoring agent dispatcher, etc., are implemented as separate components, then one or more of the components may be modified without requiring modification of the other components.

In one or more embodiments of the invention, the monitoring proxy (210) also includes a data repository (not shown) for storing historical data (e.g., data from a monitoring management host, from a mobile device, from an analysis, or from any other source). Those skilled in the art will appreciate that the use of a data repository may allow for historical analysis, data redundancy and/or backup for a monitoring management host, historical reports, or any other use for historical data. In one or more embodiments of the invention, the data repository may be stored in a thin listener (310, 315, 320), monitoring agent (330, 335, 340), monitoring agent dispatcher (345), or any other component of the monitoring proxy (210).

Figure 3:
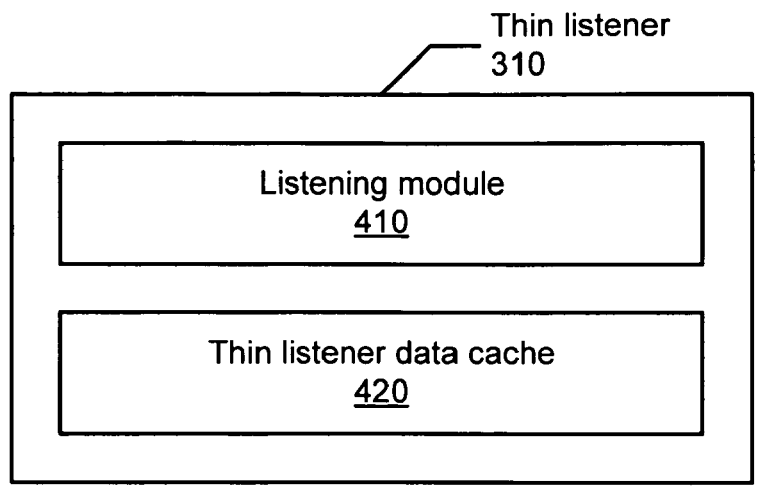
FIG. 3 shows a diagram of a thin listener in accordance with one embodiment of the invention.

FIG. 3 shows a diagram of a thin listener (310) in accordance with one embodiment of the invention. Specifically, FIG. 3 shows components of the thin listener (310), including a listening module (410) and a thin listener data cache (420). In one or more embodiments of the invention, the listening module (410) is configured to communicate with a mobile device. Specifically, the listening module (410) is configured to communicate with the mobile device in a communication format compatible with the mobile device. Further, in one or more embodiments of the invention, the listening module (410) is configured to intercept operating data (not shown) directed to the mobile device. In one or more embodiments of the invention, the operating data may include system data, application data, file data, or any other similar type of data. Intercepting operating data is discussed in detail below.

In one or more embodiments of the invention, the listening module (410) may communicate with the mobile device using session initiation protocol (SIP), user datagram protocol (UDP), remote procedure call (RPC), or any other communication format compatible with the mobile device. Those skilled in the art will appreciate that different thin listeners may use different communication formats.

In one or more embodiments of the invention, the listening module (410) is configured to store data received from the mobile device in the thin listener data cache (420). In one or more embodiments of the invention, the thin listener data cache (420) may include random access memory (RAM), internal cache (e.g., level 1 (L1) cache or level 2 (L2) cache), a persistent storage device, or any other similar type of cache. Further, in one or more embodiments of the invention, the thin listener (310) is configured to transfer data from the thin listener data cache (420) to a monitoring agent. In one or more embodiments of the invention, the data may be transferred based on the thin listener data cache (420) being full, at a predetermined time interval, in response to a request for the data, or based on any other factor.

Figure 4:
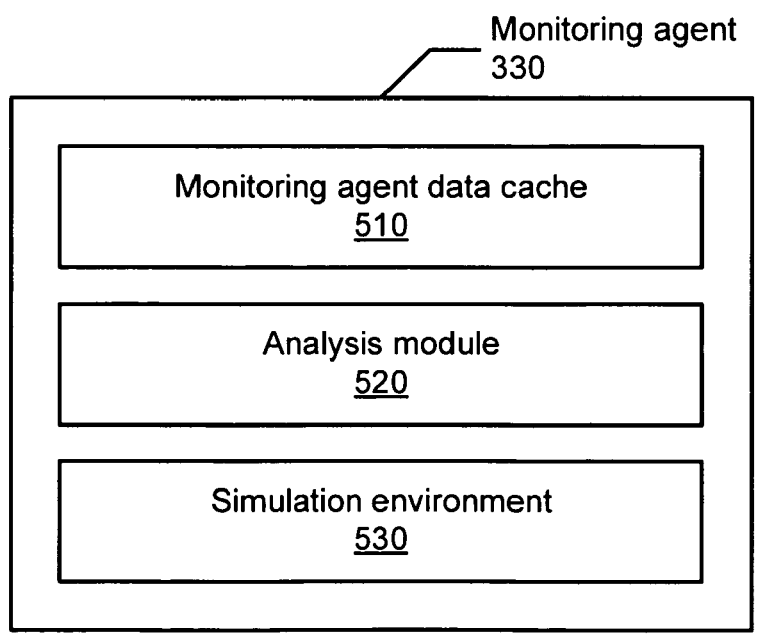
FIG. 4 shows a diagram of a monitoring agent in accordance with one embodiment of the invention.

FIG. 4 shows a diagram of a monitoring agent (330) in accordance with one embodiment of the invention. Specifically, FIG. 4 shows components of the monitoring agent (330), including a monitoring agent data cache (510), an analysis module (520), and a simulation environment (530). In one or more embodiments of the invention, the monitoring agent (330) is configured to store data received from a thin listener (e.g., data transferred from a thin listener data cache, as described above) in the monitoring agent data cache (510).

Further, in one or more embodiments of the invention, the analysis module (520) is configured to analyze the data stored in the monitoring agent data cache (510). In one or more embodiments of the invention, the data may be analyzed based on the monitoring agent data cache (510) being full, at a predetermined time interval, in response to a request for an analysis report (e.g., from a monitoring management host), or based on any other factor. Those skilled in the art will appreciate that, during analysis, the analysis module (520) may directly reference the monitoring agent data cache (510), maintain its own data cache (not shown), or use any other means for storing the data.

In one or more embodiments of the invention, the analysis module (520) is configured to use the data to calculate performance-related metrics, identify possible QoS-related issues, identify a data trend, or for any other similar type of analysis. Further, in one or more embodiments of the invention, the analysis module (520) may use additional data from another source (e.g., another monitoring agent, another thin listener, or any other source) as part of the analysis. For example, the monitoring agent (330) may be configured to monitor and analyze network performance, which may depend on latency data obtained from another monitoring agent. Those skilled in the art will appreciate that many different combinations of data from different sources may be used.

In one or more embodiments of the invention, if additional data from another source is not available, the analysis module (520) may be configured to use game theory (or any other analysis mechanism) to analyze data received from a thin listener. Specifically, the analysis module (520) may be configured to use a deterministic strategy (i.e., a particular action defined for each data condition), a random strategy (i.e., a randomized action selected for a data condition, based on a probability distribution), or any other similar type of strategy, to analyze the data. Those skilled in the art will appreciate that many different analysis mechanisms and strategies exist, and that different monitoring agents may use different analysis mechanisms and/or strategies.

For example, in one or more embodiments of the invention, data received from a thin listener may include data indicating high latency of a mobile device during a given time interval. An accurate analysis of this data may depend, for example, on whether a setting of the mobile device was recently changed, whether a large file transfer caused network congestion, or any other factor. If these data are not available, the analysis module (520) may employ a deterministic strategy, a random strategy, or any other similar type of strategy to determine an analysis result to report. For example, a deterministic strategy may base the analysis result on the time of day (e.g., network congestion may be expected during peak times). Alternatively, a random strategy may attempt to calculate the probability that the high latency is indicative of a QoS-related issue.

Returning to discussion of FIG. 4, in one or more embodiments of the invention, the monitoring agent (330) includes a simulation environment (530) configured to simulate a mobile device. More specifically, the simulation environment (530) may be configured to use operating data intercepted by a thin listener, as described above, or any other source, to simulate the mobile device. Further, in one or more embodiments of the invention, simulation may involve using historical QoS data and/or predicted usage patterns associated with the mobile device to provide for a more accurate simulation. Those skilled in the art will appreciate that the simulation environment (530) may alternatively exist in a thin listener or any other component of the monitoring proxy.

In one or more embodiments of the invention, the simulation environment (530) is configured to process the operating data in an exact, similar, or analogous way to how the mobile device would process the data. In other words, the simulation environment (530) may be configured to simulate system functions, application functions, communicative responses, or any other similar type of simulation appropriate for the mobile device being simulated. In one or more embodiments of the invention, when the mobile device becomes available, the simulation environment (530) may be synchronized with the mobile device (e.g., by retransmitting the operating data to the mobile device via a thin listener, by transmitting state data to the mobile device, or by any other means). Those skilled in the art will appreciate that in this manner, a mobile device may experience downtime without any additional loss of data or QoS.

Figure 5:
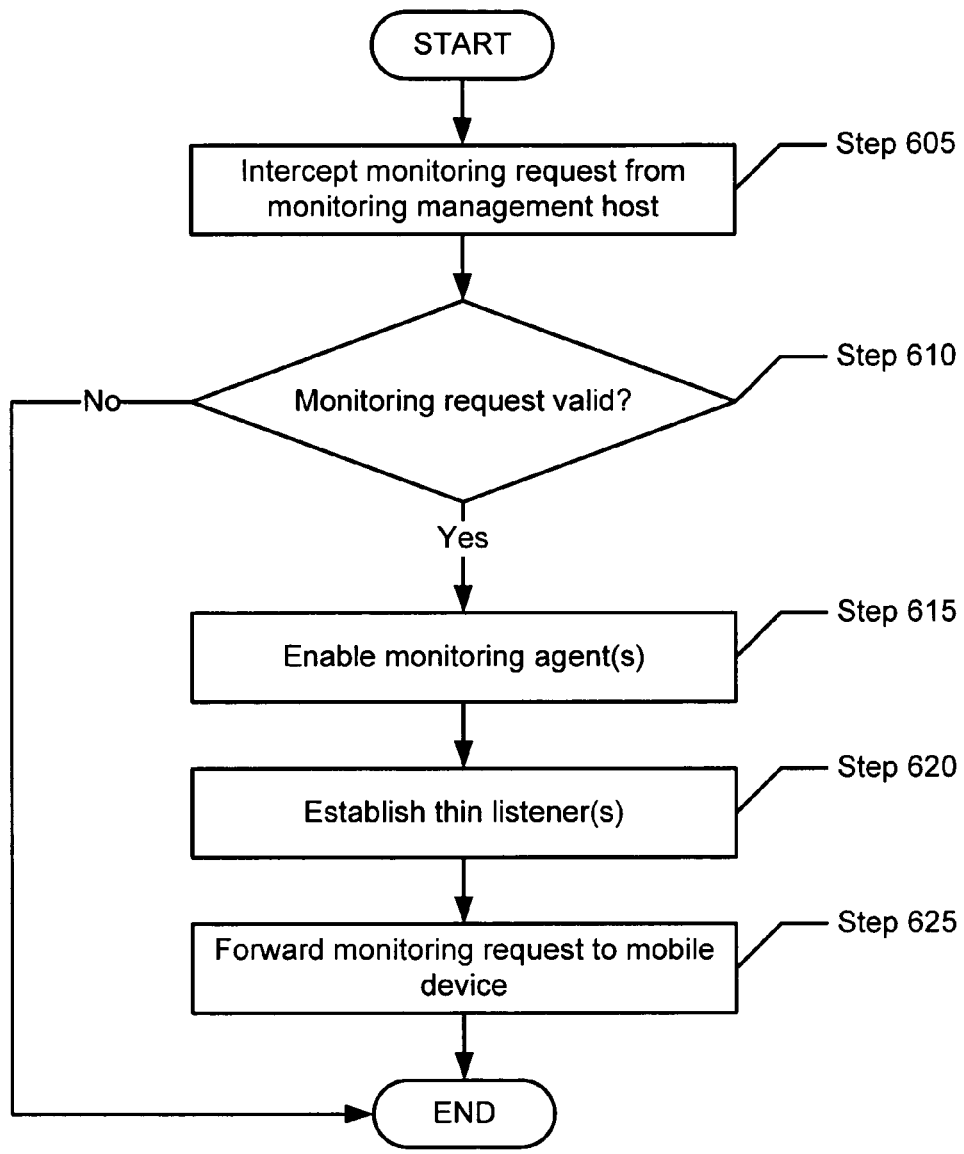
FIGS. 5-7 show flow charts in accordance with one embodiment of the invention.

FIG. 5 shows a flow chart in accordance with one embodiment of the invention. Specifically, FIG. 5 shows a flow chart of a method for processing a monitoring request in accordance with one embodiment of the invention. Initially, a monitoring proxy intercepts the monitoring request from a monitoring management host (Step 605). In one or more embodiments of the invention, the monitoring request is intercepted by a monitoring agent dispatcher of the monitoring proxy. As described above, the intercepting may be explicit or transparent to the monitoring management host.

Next, a determination is made about whether the monitoring request is valid (Step 610). For example, the monitoring proxy may validate an internet protocol (IP) address of the monitoring management host, authorize a password associated with the monitoring request, compare the monitoring request with a list of valid monitoring requests, scan the monitoring request for malicious code, or any other similar type of validation. Those skilled in the art will appreciate that any number of validation types may be used, and that different validation types may be used by different monitoring proxies, or in response to different types of monitoring request. If the monitoring request is not valid, then the process ends. Alternatively, in one or more embodiments of the invention, no validation occurs and the method continues directly to Step 615.

If the monitoring request is valid, or if no validation is required, then one or more monitoring agents are enabled (Step 615). Specifically, in one or more embodiments of the invention, one or more monitoring agents are enabled based on the type of monitoring request intercepted. In one or more embodiments of the invention, more than one monitoring agent may be enabled, for example, to monitor different aspects of a mobile device, to monitor different mobile devices, or for any other reason. Those skilled in the art will appreciate that one or more monitoring agents may be enabled by the monitoring agent dispatcher, as discussed above, or by another component of the monitoring proxy. Further, as discussed above, enabling a monitoring agent may require first instantiating the monitoring agent.

Next, one or more thin listeners are established (Step 620), in association with the monitoring agent(s). Specifically, a thin listener is established to communicate with a mobile device with which the monitoring request is associated. As discussed above, if the monitoring request is associated with multiple mobile devices, then multiple thin listeners may be established (i.e., multiple thin listeners for a single monitoring agent, multiple thin listeners in one-to-one correspondence with multiple monitoring agents, or any combination thereof). Those skilled in the art will appreciate that the thin listener may alternatively be established prior to, or concurrent with, enabling the monitoring agent(s). Further, as discussed above, establishing a thin listener may require instantiation of the thin listener.

Once a thin listener has been established, the thin listener forwards the monitoring request to the mobile device (Step 625), and the method ends. Specifically, as described above, the thin listener uses one or more communication formats compatible with the mobile device, and the monitoring request may be reformatted or otherwise modified prior to being forwarded.

In one or more embodiments of the invention, if a thin listener is located directly on a mobile device, then validation of the monitoring request (i.e., Step 610) may be performed by the thin listener, after the monitoring request is forwarded to the mobile device. In other words, as discussed above with respect to FIG. 2, the thin listener may be responsible for authorizing the monitoring agent to perform monitoring functions associated with the mobile device. Further, as discussed above, in one or more such cases, establishing the thin listener may not be required.

Figure 6:
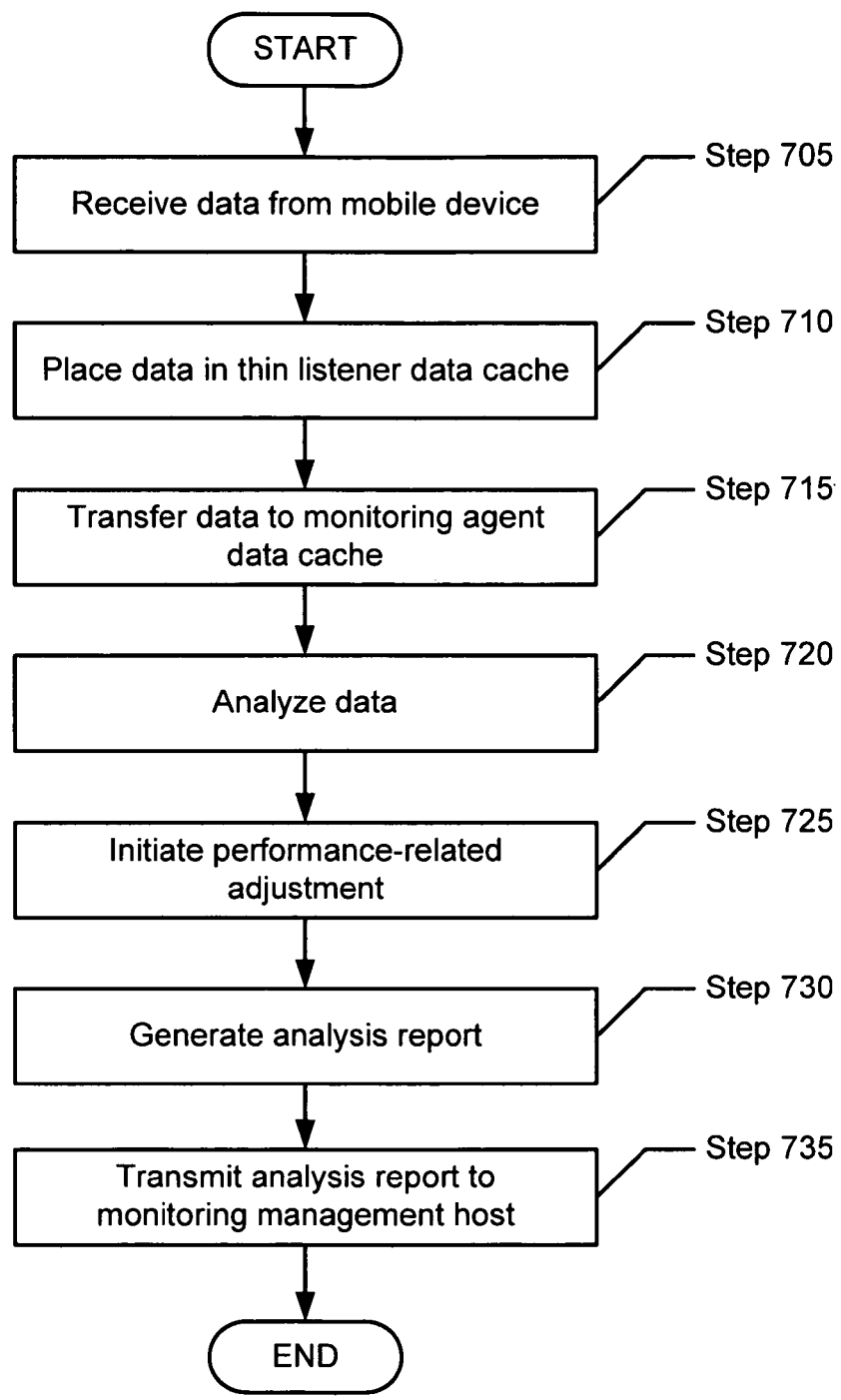

FIG. 6 shows a flow chart in accordance with one embodiment of the invention. Specifically, FIG. 6 shows a flow chart of a method for analyzing data received from a mobile device in accordance with one embodiment of the invention. Initially, data is received from a mobile device, by a monitoring proxy (Step 705). In one or more embodiments of the invention, the data is received by a thin listener of the monitoring proxy associated with the mobile device.

In one or more embodiments of the invention, the received data is placed in a thin listener data cache maintained by the thin listener (Step 710). In one or more embodiments of the invention, the data is then transferred to a monitoring agent data cache maintained by a monitoring agent (Step 715). The monitoring agent then analyzes the data (Step 720). Those skilled in the art will appreciate that many different ways exist for a thin listener and monitoring agent to handle the data. For example, the thin listener may transfer the data directly to the monitoring agent, without using a thin listener data cache, and the monitoring agent may analyze the data immediately, without using a monitoring agent data cache. However, those skilled in the art will appreciate that using a thin listener data cache and a monitoring agent data cache provides at least two levels of data caching and/or aggregation, thereby reducing processing and/or network overhead.

In one or more embodiments of the invention, the monitoring agent is configured to initiate a performance-related adjustment (Step 725) based on the analysis performed in Step 725. Those skilled in the art will appreciate that initiating a performance-related adjustment may take many forms, and that the performance-related adjustment itself may ultimately be performed at many different locations, including the mobile device, the monitoring management host, and/or any component(s) of the monitoring proxy. For example, the monitoring agent may transmit a request to the mobile device to change a setting of the mobile device, transmit a request to the monitoring management host to change a service-related setting, issue a function call in the monitoring agent to execute a performance-related adjustment at the monitoring agent itself, initiate creation of a helpdesk ticket, or initiate any other similar type of performance-related adjustment. Those skilled in the art will appreciate that a performance-related adjustment may be initiated, for example, if the analysis performed in Step 720 indicates that a QoS-related issue exists.

In one or more embodiments of the invention, the monitoring agent is configured to generate an analysis report (Step 730) of the analysis performed in Step 720, and transmit the analysis report to the monitoring management host (Step 735). The analysis report may be a data aggregation, a trend report, raw data, filtered data, a table, a chart, a textual report, or any other similar type of report. Further, the analysis report may be transmitted in extensible markup language (XML), a query string, a remote procedure call (RPC), electronic mail, or any other similar type of transmittal. Those skilled in the art will appreciate that the monitoring management host may then take an appropriate action based on receiving and/or processing the analysis report, such as initiating a performance-related adjustment, or any other similar type of action. Alternatively, the monitoring management host may simply store the analysis report.

Those skilled in the art will appreciate that transmitting an analysis report may require less network traffic than directly transmitting the data received from the mobile device. Accordingly, one or more embodiments of the invention provide a means for reducing monitoring-related network traffic between a mobile device and a monitoring management host.

Figure 7:
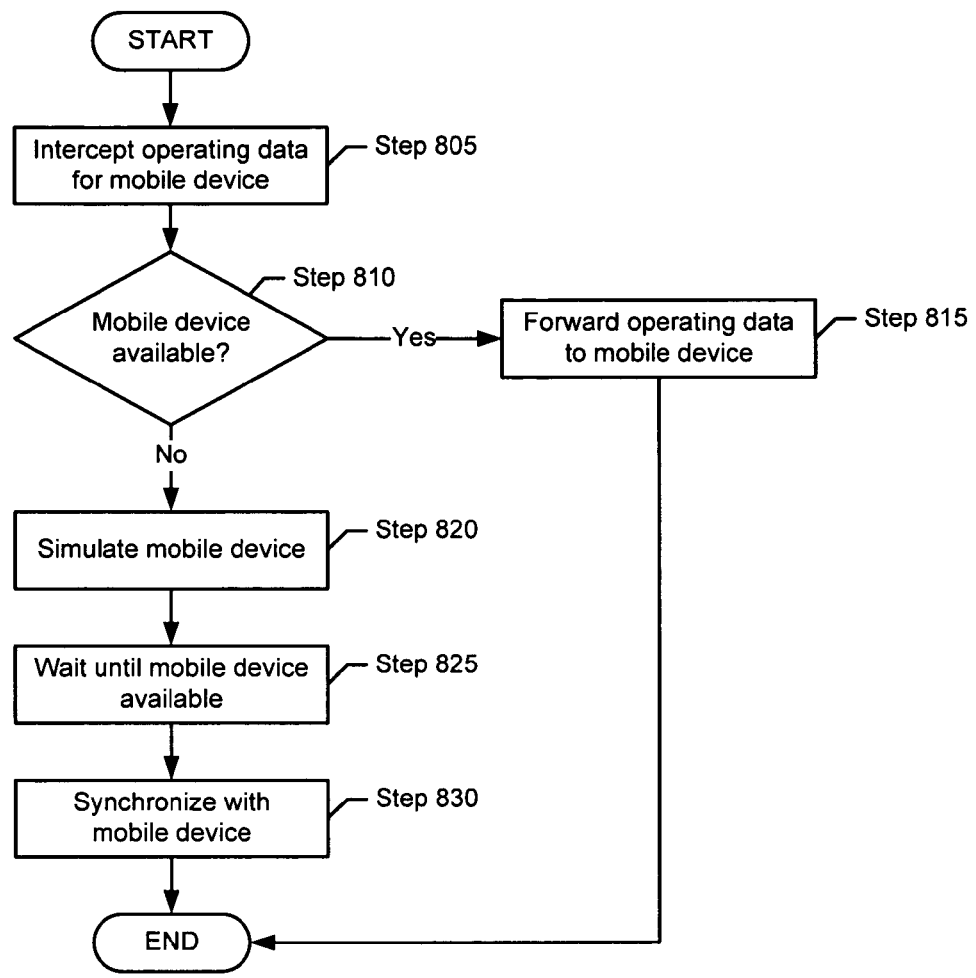

In one or more embodiments of the invention, the monitoring proxy is configured to simulate a mobile device. FIG. 7 shows a flow chart in accordance with one embodiment of the invention. Specifically, FIG. 7 shows a flow chart of a method for simulating a mobile device in accordance with one embodiment of the invention. Initially, the monitoring proxy intercepts operating data for the mobile device (Step 805). In one or more embodiments of the invention, the operating data may be intercepted by a thin listener, a monitoring agent, or any other component of the monitoring proxy. Further, the operating data may be intercepted explicitly or transparently—i.e., the source of the operating data may or may not intend for the operating data to be intercepted by the monitoring proxy.

Once the monitoring proxy (e.g., a listening module of a thin listener of the monitoring proxy) intercepts the operating data, a determination is made about whether the mobile device is available (Step 810). In one or more embodiments of the invention, determining whether the mobile device is online may include referencing an availability table, attempting to forward the operating data and waiting for an acknowledgement, pinging the mobile device, or any other similar type of availability determination. If the mobile device is available, then the operating data is forwarded to the mobile device (Step 815), and the method ends. Those skilled in the art will appreciate that if determining whether the mobile device is online includes attempting to forward the operating data to the mobile device, then it may not be necessary to forward the operating data to the mobile device again.

Alternatively, if the mobile device is not available, then the operating data may instead be forwarded to a simulation environment (e.g., a simulation environment of a monitoring agent of the monitoring proxy, or any other similar type of simulation environment). The simulation environment subsequently simulates the mobile device (Step 820). As described above, simulating the mobile device may involve processing the operating data in an exact, similar, or analogous way to how the mobile device would process the data. In other words, the simulation environment may simulate system functions, application functions, communicative responses, or any other similar type of simulation appropriate for the mobile device being simulated.

In one or more embodiments of the invention, when the simulation is complete, the monitoring proxy waits until the mobile device is available (Step 825). The waiting may involve waiting for a broadcast from the mobile device, pinging the mobile device at regular intervals until receiving a reply, or any other similar type of waiting. More specifically, in one or more embodiments of the invention, a service discovery protocol (SDP), or any other similar protocol, may be used to discover and reconnect to the mobile device. Those skilled in the art will appreciate that if additional operating data is received while waiting, then the simulation environment may simulate the mobile device again.

In one or more embodiments of the invention, once the mobile device is available, the simulation environment is synchronized with the mobile device (Step 830). As described above, synchronizing the simulation environment with the mobile device may involve retransmitting the operating data to the mobile device (e.g., via a thin listener), transmitting state data to the mobile device, or any other form of synchronization. Once the simulation environment and the mobile device are synchronized, the method ends.

Figure 8:
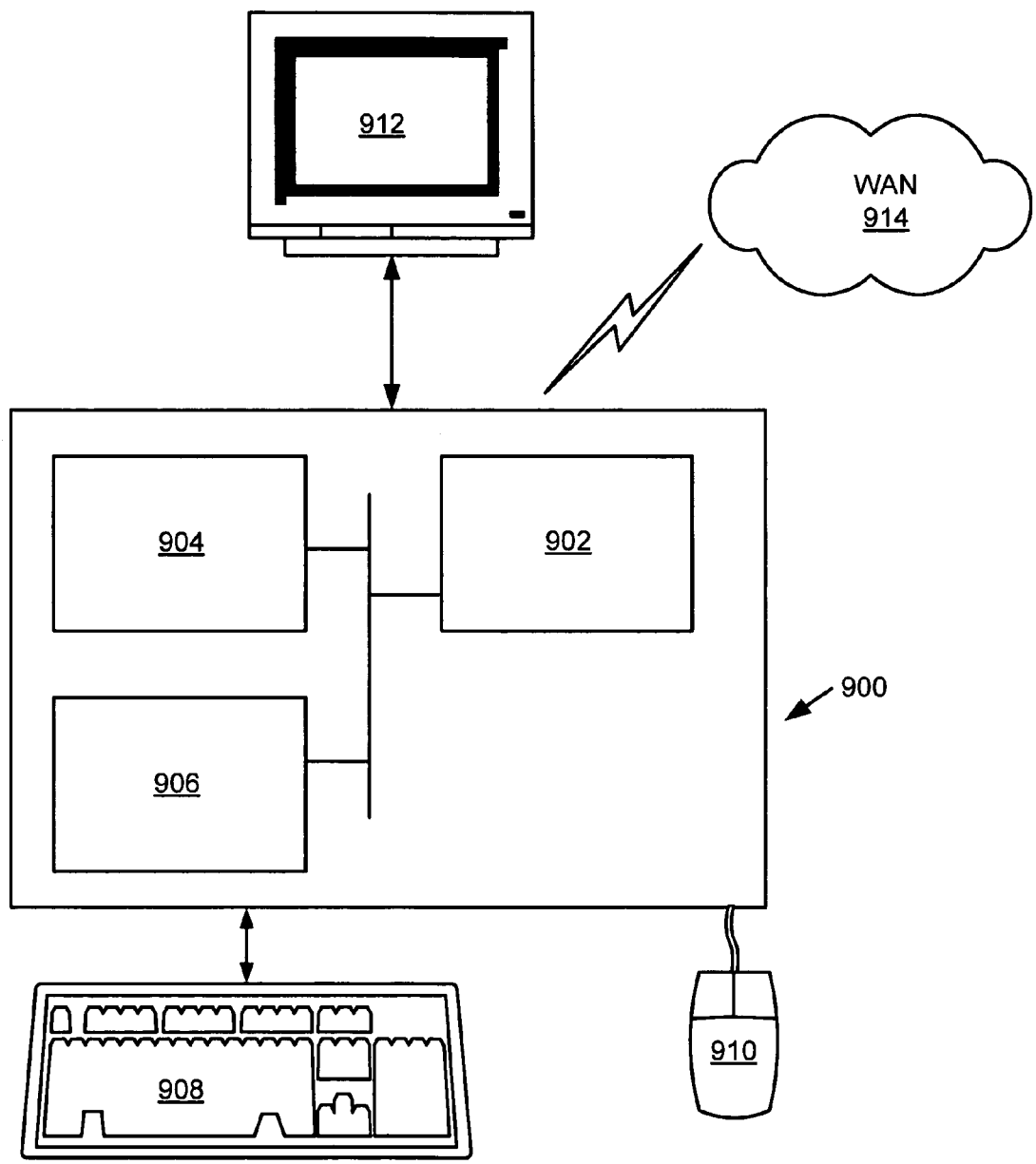
FIG. 8 shows a diagram of a computer system in accordance with one embodiment of the invention.

The invention may be implemented on virtually any type of computer regardless of the platform being used. For example, as shown in FIG. 8, a computer system (900) includes a processor (902), associated memory (904), a storage device (906), and numerous other elements and functionalities typical of today's computers (not shown). The computer (900) may also include input means, such as a keyboard (908) and a mouse (910), and output means, such as a monitor (912). The computer system (900) may be connected to a local area network (LAN) or a wide area network (e.g., the Internet) (914) via a network interface connection (not shown). Those skilled in the art will appreciate that these input and output means may take other forms.

Further, those skilled in the art will appreciate that one or more elements of the aforementioned computer system (900) may be located at a remote location and connected to the other elements over a network. Further, the invention may be implemented on a distributed system having a plurality of nodes, where each portion of the invention (e.g., monitoring management host, monitoring proxy, mobile device, monitoring agent dispatcher, monitoring agent, thin listener, listening module, thin listener cache, monitoring agent data cache, analysis module, simulation environment, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring performance of a mobile device, comprising:
   intercepting a first monitoring request from a monitoring management host, wherein the first monitoring request is associated with the mobile device;
   enabling a first monitoring agent associated with the mobile device;
   establishing a first thin listener associated with the first monitoring agent;
   transmitting a second monitoring request, in response to the first monitoring request, to the mobile device;
   receiving, by the first thin listener, data from the mobile device in response to the second monitoring request;
   analyzing the data received in response to the second monitoring request to obtain an analysis report; and
   transmitting the analysis report to the monitoring management host, in response to the first monitoring request.

2. The method of claim 1, further comprising:
   validating the first monitoring request, wherein enabling the first monitoring agent is performed if the first monitoring request is valid.

3. The method of claim 1, further comprising:
   initiating a performance-related adjustment, based on the analysis report.

4. The method of claim 1, wherein analyzing the data received in response to the second monitoring request comprises:
   placing the data in a first thin listener data cache associated with the first thin listener;
   transferring the data from the first thin listener data cache to a first monitoring agent data cache associated with the first monitoring agent;
   processing the data stored in the first monitoring agent data cache.

5. A system comprising:
   a monitoring agent dispatcher configured to:
      intercept a first monitoring request from a monitoring management host, wherein the first monitoring request is associated with a mobile device, and
      enable a first monitoring agent associated with the mobile device;
   a first thin listener configured to:
      transmit a second monitoring request to the mobile device, in response to the first monitoring request,
      receive data from the mobile device, in response to the second monitoring request, and
      transfer the data to the first monitoring agent; and
   the first monitoring agent, configured to:
      analyze the data to obtain an analysis report, and
      transmit the analysis report to the monitoring management host, in response to the first monitoring request.

6. The system of claim 5, wherein the first monitoring agent is further configured to establish the first thin listener.

7. The system of claim 5, wherein the first monitoring agent is further configured to initiate a performance-related adjustment, based on the analysis report.

8. The system of claim 7, wherein the performance-related adjustment is performed by the monitoring management host.

9. The system of claim 5, wherein the monitoring agent dispatcher is further configured to validate the first monitoring request, and wherein the first monitoring agent is enabled only if the first monitoring request is valid.

10. The system of claim 5, wherein
the first thin listener comprises a first thin listener data cache, and
the first monitoring agent comprises a first monitoring agent data cache and an analysis module,
wherein transferring the data to the first monitoring agent comprises transferring the data from the first thin listener data cache to the first monitoring agent data cache, and wherein analyzing the data is performed by the analysis module.

11. The system of claim 10, wherein transferring data to the first monitoring agent is performed based on the first thin listener data cache being full.

12. The system of claim 5, wherein analyzing the data comprises using game theory.

13. The system of claim 5, wherein analyzing the data comprises using additional data from a second thin listener.

14. The system of claim 5, wherein receiving the data from the mobile device comprises a session initiation protocol (SIP) communication.

15. The system of claim 5, wherein the first thin listener is further configured to:
intercept operating data for the mobile device, wherein the operating data is forwarded to the mobile device if the mobile device is available, and
if the mobile device is not available:
the mobile device is simulated; and
the mobile device is resynchronized with a result of the simulating, when the mobile device becomes available.

16. The system of claim 15, wherein the mobile device is simulated by the monitoring agent.

17. A computer readable medium comprising executable instructions for executing on a processor for monitoring performance of a mobile device by:
intercepting a first monitoring request from a monitoring management host, wherein the first monitoring request is associated with the mobile device;
enabling a first monitoring agent associated with the mobile device;
establishing a first thin listener associated with the first monitoring agent;
transmitting a second monitoring request, in response to the first monitoring request, to the mobile device;
receiving, by the first thin listener, data from the mobile device in response to the second monitoring request;
analyzing the data received in response to the second monitoring request to obtain an analysis report; and
transmitting the analysis report to the monitoring management host, in response to the first monitoring request.

18. The computer readable medium of claim 17, further comprising executable instructions for monitoring performance of a mobile device by:
validating the first monitoring request, wherein enabling the first monitoring agent is performed if the first monitoring request is valid.

19. The computer readable medium of claim 17, further comprising executable instructions for monitoring performance of a mobile device by:
initiating a performance-related adjustment, based on the analysis report.

20. The computer readable medium of claim 17, wherein analyzing the data received in response to the second monitoring request comprises:
placing the data in a first thin listener data cache associated with the first thin listener;
transferring the data from the first thin listener data cache to a first monitoring agent data cache associated with the first monitoring agent;
processing the data stored in the first monitoring agent data cache.

* * * * *